United States Patent [19]

Folarin

[11] Patent Number: 4,934,749
[45] Date of Patent: Jun. 19, 1990

[54] METERING PIN FOR AN ENERGY ABSORBER

[75] Inventor: Abayomi O. Folarin, Dayton, Ohio

[73] Assignee: General Motors Corporation, Detroit, Mich.

[21] Appl. No.: 402,307

[22] Filed: Sep. 5, 1989

[51] Int. Cl.$^5$ ............................................. B60R 19/32
[52] U.S. Cl. ................................... 293/134; 188/289; 267/64.18; 267/64.22
[58] Field of Search ................ 293/134, 132; 188/289; 267/116, 64.18, 64.22

[56] References Cited

U.S. PATENT DOCUMENTS

| | | | |
|---|---|---|---|
| 3,008,746 | 11/1961 | Senger | 293/134 |
| 3,887,224 | 6/1975 | Browne | 293/134 |
| 4,054,311 | 10/1977 | Gute | 293/134 |
| 4,097,080 | 6/1978 | Petry | 293/134 |
| 4,426,109 | 1/1984 | Fike, Jr. | 188/289 |
| 4,789,192 | 12/1988 | Warner et al. | 293/134 |

Primary Examiner—Robert R. Song
Attorney, Agent, or Firm—A. Michael Tucker

[57] ABSTRACT

A moldable metering pin for an energy absorber unit includes an integral base having a plurality of openings. The base is press-fitted in an outer cylinder of the unit. The openings in the base prevent the formation of air pockets between the base and an end cap of the outer cylinder. During impact, fluid in a rear chamber passes to the end cap, thereby reducing fluid forces on the base of the metering pin.

7 Claims, 2 Drawing Sheets

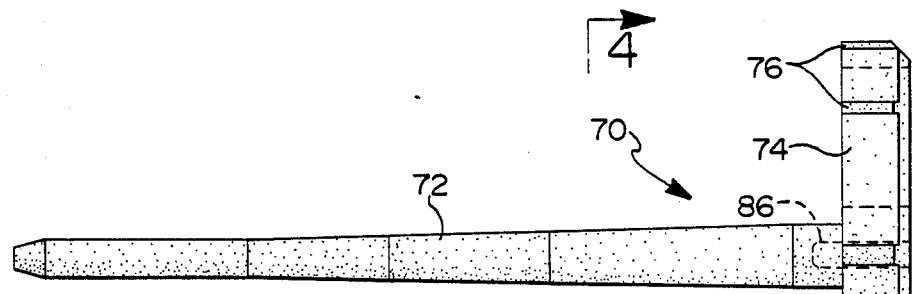
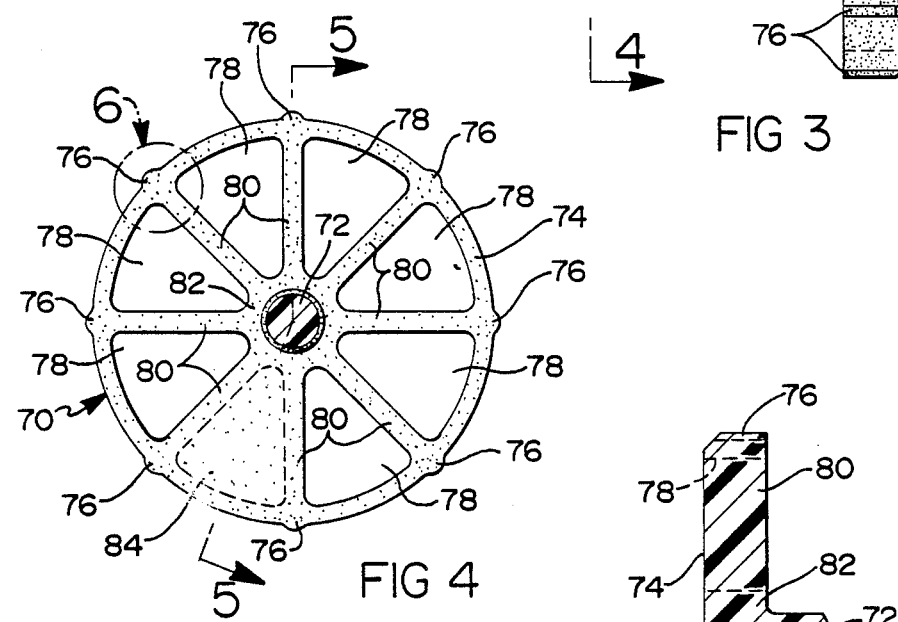
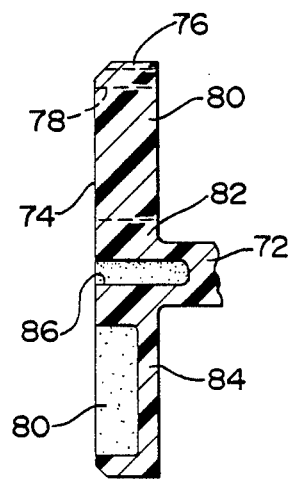
FIG 3
FIG 4
FIG 5
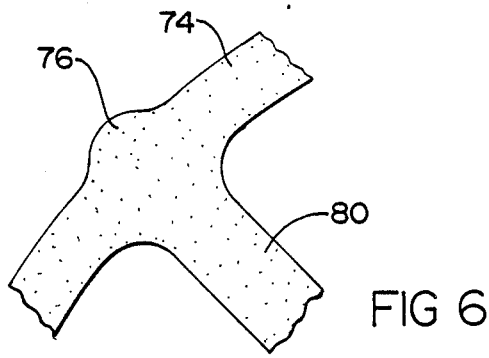
FIG 6

METERING PIN FOR AN ENERGY ABSORBER

BACKGROUND OF THE INVENTION

1. Field of the Invention

The present invention relates generally to energy absorber units mounting a bumper to a vehicle frame, and in particular is concerned with metering pin for metering the flow of fluid between fluid chambers as an energy absorber unit telescopes in response to an impact on the bumper.

2. Description of the Related Art

Energy absorber units for mounting vehicle bumpers are well-known. Many hydraulic energy absorber units employ fixed, longitudinally-extending, metallic metering pins which are centrally welded to an end cap of the unit and which extend into an associated oil flow control orifice to meter fluid between fluid pressure chamber to absorb impact energy. To compensate for manufacturing tolerance variations which can result in an axial misalignment of the centrally fixed metering rod and orifice, conventional units feature radially adjustable orifices. While such constructions have compensated for the metering pin and orifice misalignment, their construction is relatively complex and expensive and requires the metering pin to be welded or otherwise fixed to the unit.

U.S. Pat. No. 3,887,224 titled "Impact Energy Absorber With Radially Adjustable Flow Metering Pin," issued June 3, 1975 and assigned to the present assignee, discloses a moldable metering pin for an energy absorbing unit. In one embodiment, the metering pin or rod is adjustable with respect to the axis of the unit so that it can float in alignment with a fixed fluid flow control orifice In a second embodiment, the pin includes a base constructed from inner and outer support rings and a thin wall portion having concentric corrugations. The base provides a flexible support to permit the radial adjustment of the pin relative to a fixed orifice.

The art continues to seek improvements. In an energy absorber unit, it is desirable to utilize a moldable metering pin to reduce manufacturing and assembly costs. Furthermore, it is desirable to provide an economical, moldable metering pin capable of being press-fitted into a receiving cylinder and capable of performing during impact.

SUMMARY OF THE INVENTION

The present invention provides an economical, moldable metering pin for an energy absorber unit. The metering pin is molded from a suitable plastic material and is compatible with current energy absorber units. The metering pin includes a base for press-fitting the pin in place, thereby eliminating the need for a floating orifice or welding of the pin in place. Furthermore, the base includes a plurality of openings which prevent air or any fluid from being trapped between the base and an end cap of the unit. The elimination of air pockets permits fluid in a chamber to press against a stronger end cap, thereby reducing the fluid forces on the base.

In a preferred embodiment, the present invention includes a moldable metering pin for an energy absorber unit. The pin includes an integral base having a plurality of openings. The base is press-fitted into an outer cylinder of the unit. The openings in the base prevent the formation of air pockets between the base and an end cap of the outer cylinder. During impact, fluid in a rear chamber passes to the end cap, thereby reducing fluid forces on the base of the metering pin.

BRIEF DESCRIPTION OF THE DRAWINGS

FIG. 3 is a side elevational view of the present metering pin removed from the energy absorber unit of FIG. 2 for purposes of clarity of illustration.

FIG. 4 is a sectional view taken generally along the plane indicated by lines 4—4 of FIG. 3 illustrating a plurality of openings and a cover provided in a base of the present metering pin.

FIG. 5 is a section view taken generally along the lines 5—5 of FIG. 4 illustrating the cover in the base.

FIG. 6 is a greatly enlarged top elevational view of the area indicated by the broken circle in FIG. 4 illustrating a ridge on the outer surface of the base.

DETAILED DESCRIPTION OF THE PREFERRED EMBODIMENT

Figure 1:
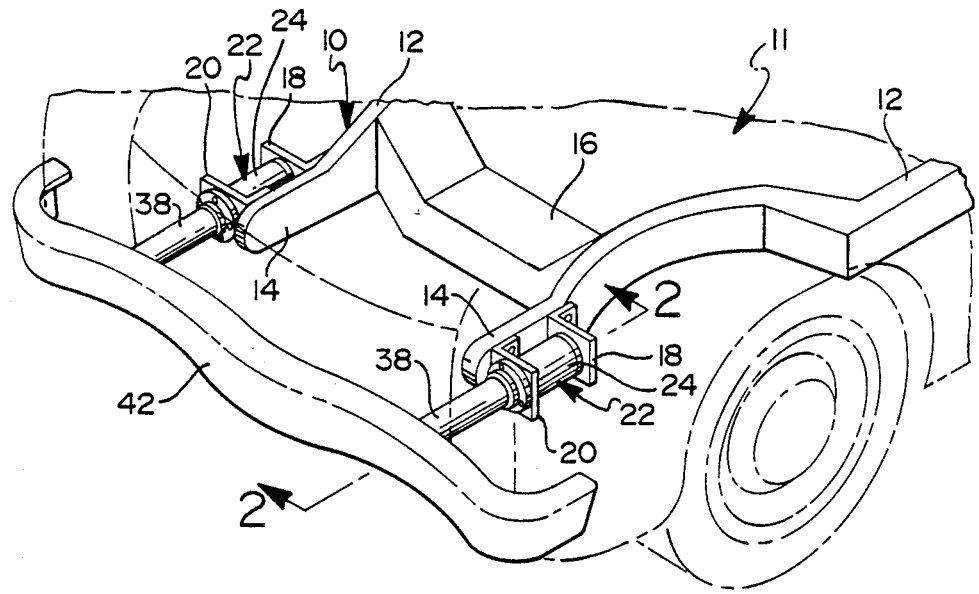
FIG. 1 is a perspective view of an automotive vehicle chassis frame and energy absorber units mounting a bumper assembly to the frame.

A chassis frame 10 and the schematic outline of the front end of a vehicle 11 are illustrated in FIG. 1. The chassis frame 10 includes a pair of laterally spaced side rails 12 having forwardly extending horn portions 14 interconnected by a front cross member 16. Bolted to each horn portion 14 is a pair of L-shaped brackets 18 and 20 which are longitudinally spaced from each other and connect energy absorber units indicated generally at 22 to the chassis frame 10. Each energy absorber unit 22 extends through a circular opening in its associated outermost bracket 20 and has an outer cylinder 24 welded at 26 to a collar 28. The outer cylinder 24 is closed at its inner or rearward end by an end cap 30 secured to the cylinder 24 by an annular weld 32. The end cap 30 has a central threaded stud 34 rigidly fixed thereto which projects outwardly through an opening 35 in bracket 18. A nut 36 threaded onto stud 34 rigidly secures the end cap 30 and the outer cylinder 24 to the bracket 18.

In addition to the outer cylinder 24, each energy absorber unit 22 includes an inner cylinder 38 which is mounted for limited telescoping movement within the outer cylinder 24 and which projects forwardly therefrom. The outer or forward end of the inner cylinder 38 is closed by a base plate 40 secured to the cylinder 38 by an annular weld 41. The base plate 40 is adapted to be secured to a bumper assembly 42 by any suitable means (not illustrated). A flash shield 43 prevents the entry of weld flash into the interior of the inner cylinder 38. Secured to the inner or rearward end of each inner cylinder 38 is a cap 44 that divides intermediate and rear fluid chambers, 46 and 48 respectively. Each of the chambers 46 and 48 is filled with a suitable hydraulic fluid such as oil. The cap 44 is formed with a centralized annular flow control orifice 49 providing a fluid passage between chambers 46 and 48.

Figure 2:
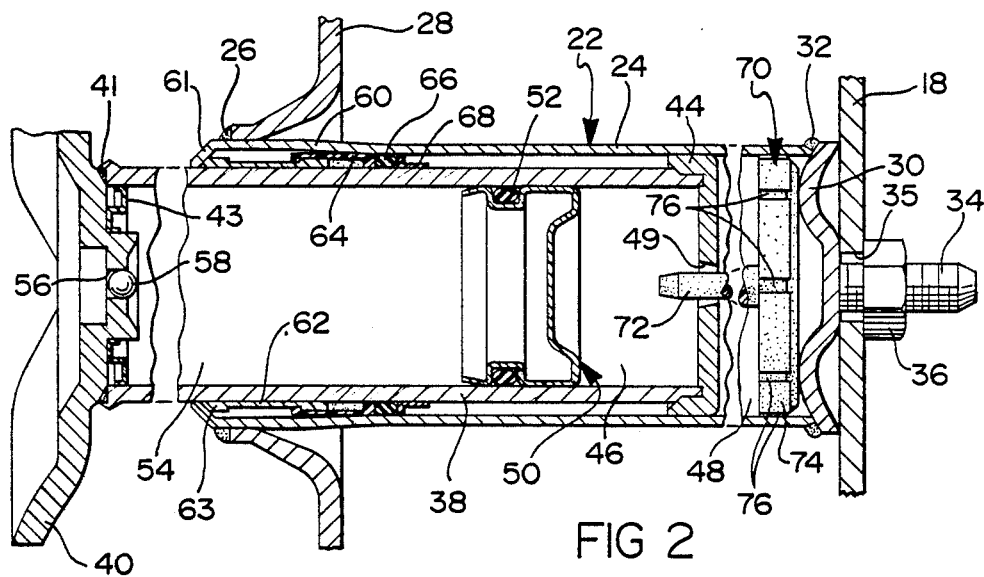
FIG. 2 is an enlarged sectional view taken generally along the plane indicated by lines 2—2 of FIG. 1 illustrating the energy absorbing unit in its pre-impact position.

Disposed within the inner cylinder 38 is a floating piston 50, preferably formed from sheet metal and fitted with an O-ring 52 that separates the intermediate chamber 46 from a front chamber 54 formed between the floating piston 50 and the base plate 40. A quantity of pressurized gas is injected into the front chamber 54 through an orifice 56 formed in the base plate 40 and subsequently sealed by a ball 58 welded therein. The pressurized gas in the front chamber 54 urges the cylinders 24 and 38 to the normally extended pre-impact position shown in FIG. 2.

The outer or forward end of the outer cylinder is bulged at 60 and includes an inwardly tapering wall 61. An annular bearing and stabilizing sleeve 62 of steel or other suitable material is welded to the inner cylinder 38 and has at its forward extremity a tapering head 63 which snugly engages the tapering wall 61 to prevent radial play between the two cylinders 24 and 38 in their extended position and to form a stop for the cylinders 24 and 38 when expanding to the FIG. 2 position. The bearing and stabilizing sleeve 62 extends around the inner cylinder 38 and carries a resilient sleeve 64 of a thermoplastic material such as TEFLON or NYLON. An O-ring 66 of an elastomeric material is trapped between the end of the sleeve 64 and a ring member 68 secured to the cylinder 38 to provide a fluid seal between the cap 44 and the outer cylinder 24.

The flow control orifice 49 cooperates with an axially extending tapered metering pin indicated generally at 70 which projects into the orifice 49 and cooperates therewith to control the flow of fluid between the chambers 46 and 48 in response to the telescoping movement of the two cylinders 24 and 38 when the bumper assembly 42 is impacted and moved axially and with respect to the chassis frame 10.

The metering pin 70 includes a tapered rod 72 and an annular base 74 as shown in FIG. 3. Preferably, the tapered rod 72 and the base 74 are formed from a suitable plastic material and molded as an integral unit. The diameter of the base 74 is slightly less than the inner diameter of the outer cylinder 24 so that the base 74 can be press-fitted inside the outer cylinder 24 adjacent the end cap 30. A plurality of ridges 76 are provided on the outer circumference of the base 74. The ridges 76 enhance the press-fit between the base 74 and the outer cylinder 24 and compensate for variances in the diameter of the outer cylinder 24. When the base 74 is installed in the outer cylinder 24, the tapered rod 72 is aligned with the orifice 49.

The base 74 includes a plurality of openings 78 illustrated best in FIG. 4. In the embodiment illustrated in the figures, the openings 78 are bounded by a plurality of spokes 80 which radiate from a central portion 82 of the base 74. Preferably, the tapered rod 72 is molded integrally with the central portion 82. During installation of the pin 70 in the outer cylinder 24, the openings 78 prevent air or any other fluid from being trapped and sealed between the base 74 and the end cap 30.

If desired, a cover 84 can be provided between any of the spokes 80 and integrally molded with the base 74. The cover 84 can be used to carry identification information, e.g. a part number, or any other desired data. A release gate 86 can be provided in the central portion 82 to facilitate removal of the pin 70 from a mold (not illustrated).

On impact of the bumper assembly 42, the inner cylinder 38 telescopes into the outer cylinder 24 as the orifice 49 receives the rod 72 of the metering pin 70. As the inner cylinder 38 strokes rearwardly, the orifice 49 progressively restricts the flow of fluid from the rear chamber 48 into the intermediate chamber 46 to absorb the impact energy. During this time the front chamber 46 contracts, thereby compressing the gas in the front chamber 54 to store sufficient return energy therein to move the cylinders 24 and 38 to their pre-impact position (FIG. 2) when the impact force is removed.

The openings 78 of the base 74 prevent the destruction of the base 74 during impact of the bumper assembly 42 and the collapse of the telescoping cylinders 24 and 38 as described above. As fluid pressure builds in the rear chamber 48 during impact, increased forces are exerted on the outer cylinder 24 and the base 74. Without the openings 78, such forces could exceed the strength of the plastic base 74, resulting in cracks and the destruction of the base 74, thereby adversely affecting the operation of the energy absorber 22. However, the openings 78 in the present base 74 permit the fluid pressure to be contained by the stronger end cap 30 welded to the outer cylinder 24. Thus the present invention teaches an economical metering pin 70 having openings 78 in its base 74 which is capable of properly functioning during impact.

Although the present invention has been described with reference to a preferred embodiment, workers skilled in the art will recognize that changes may be made in form and detail without departing from the spirit and scope of the invention. For example, openings 78 of any shape can be provided in the base 74 of the metering pin 70 to permit the passage of fluid through the base 74 to the end cap 30. Furthermore, any covers can be incorporated with the base 74 to carry information and the like so long as a suitable area remains open to permit the passage of fluid through the base 74 to the end cap 30.

The embodiments of the invention in which an exclusive property or privilege is claimed are defined as follows:

1. An impact energy absorber unit for mounting a bumper assembly to a vehicle body structure, comprising:
   (a) first and second cylinders;
   (b) support means mounting the first cylinder for telescopic movement with respect to the second cylinder between an extended position and a retracted position;
   (c) a cap secured to a first end of the first cylinder thereby dividing the cylinders into first and second hydraulic chambers, the cap having a fixed central orifice providing hydraulic communication between the chambers;
   (d) a molded metering pin extending longitudinally in the unit, the metering pin including
      (i) a rod disposed within the central orifice, and
      (ii) a base connected to the rod, the diameter of the base being of sufficient size to provide a press fit into the second cylinder, thereby fixing the location of the rod within the central orifice, and
      (iii) a plurality of openings in the base to permit the flow of fluid through the base within the second cylinder during movement of the cylinders.

2. The impact energy absorber unit as specified in claim 1 wherein the base includes a plurality of ridges on it outer circumference.

3. The impact energy absorber unit as specified in claim 2 wherein the base includes a cover on a portion of the base.

4. A moldable metering pin for controlling fluid flow in an energy absorber unit, comprising:
   (a) a longitudinally extending rod;
   (b) a circular base integrally molded to one end of the rod;

(c) at least one opening in the base for permitting fluid to pass by the base when the pin in installed in the energy absorber unit.

5. The metering pin as specified in claim 4 wherein a plurality of openings in the base are divided by spokes radiating from a central portion of the base.

6. The metering pin as specified in claim 4 including a plurality of ridges on the outer circumference of the base.

7. The metering pin as specified in claim 4 including a cover on a portion of the base.

* * * * *